US009233785B2

(12) United States Patent
Hirama et al.

(10) Patent No.: US 9,233,785 B2
(45) Date of Patent: Jan. 12, 2016

(54) LID OPENING/CLOSING MECHANISM AND STORAGE DEVICE

(75) Inventors: Taku Hirama, Utsunomiya (JP); Taku Kamiya, Wako (JP); Hiroyuki Inoue, Toyoake (JP)

(73) Assignees: NIFCO INC., Yokohama-shi, Kanagawa-ken (JP); HONDA MOTOR CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 14/125,791

(22) PCT Filed: Jun. 15, 2012

(86) PCT No.: PCT/JP2012/065413
§ 371 (c)(1),
(2), (4) Date: Dec. 12, 2013

(87) PCT Pub. No.: WO2012/173246
PCT Pub. Date: Dec. 20, 2012

(65) Prior Publication Data
US 2014/0131357 A1    May 15, 2014

(30) Foreign Application Priority Data

Jun. 16, 2011  (JP) ................................. 2011-133878

(51) Int. Cl.
*B65D 43/14* (2006.01)
*B65D 51/24* (2006.01)
*B60R 7/06* (2006.01)
*E05F 1/10* (2006.01)

(52) U.S. Cl.
CPC ............... *B65D 51/243* (2013.01); *B60R 7/06* (2013.01); *E05F 1/10* (2013.01); *E05Y 2900/538* (2013.01)

(58) Field of Classification Search
CPC ... B65F 1/163; B60R 2011/0005; B60R 7/06; B65D 43/26; B65D 51/243; E05Y 2900/538; E05F 1/10
USPC .................... 220/262–264, 827, 830; 224/483
See application file for complete search history.

(56) References Cited

U.S. PATENT DOCUMENTS

2005/0133523 A1* 6/2005 Kim ............................. 220/827
2013/0062304 A1* 3/2013 Meyers et al. ................ 215/240

FOREIGN PATENT DOCUMENTS

| JP | H06-087090 U | 12/1994 |
| JP | 2007-138567 A | 6/2007 |
| JP | 2009-154568 A | 7/2009 |

OTHER PUBLICATIONS

PCT, "International Search Report for PCT/JP2012/065413".

* cited by examiner

*Primary Examiner* — Fenn Mathew
*Assistant Examiner* — James N Smalley
(74) *Attorney, Agent, or Firm* — Manabu Kanesaka

(57) ABSTRACT

A lid opening/closing mechanism switches a lid between a closed position closing an opening portion of a box-like base body, and an open position opening the opening portion. A distinct point is to include an arm allowing a tip side to turn to a front of the base body as a support point on a base end side pivotally supported at the base body by a first axis support portion, and connected to the lid turnably by a second axis support portion. The lid is turned in an opening direction or a closing direction in association with a turn of the arm.

8 Claims, 10 Drawing Sheets

(Lid position in case the lid is rotated to an open position around a support point 9a, as Prior Art)
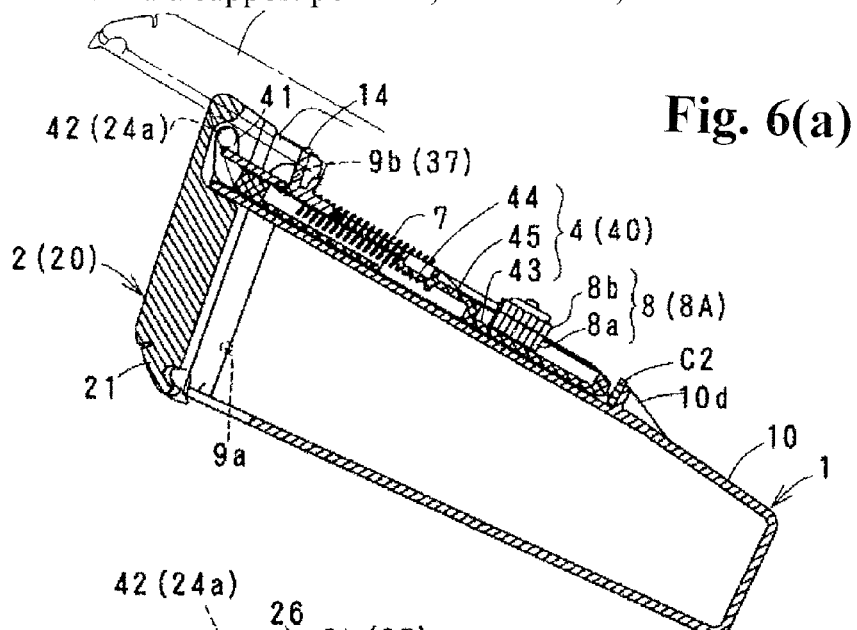
Fig. 6(a)
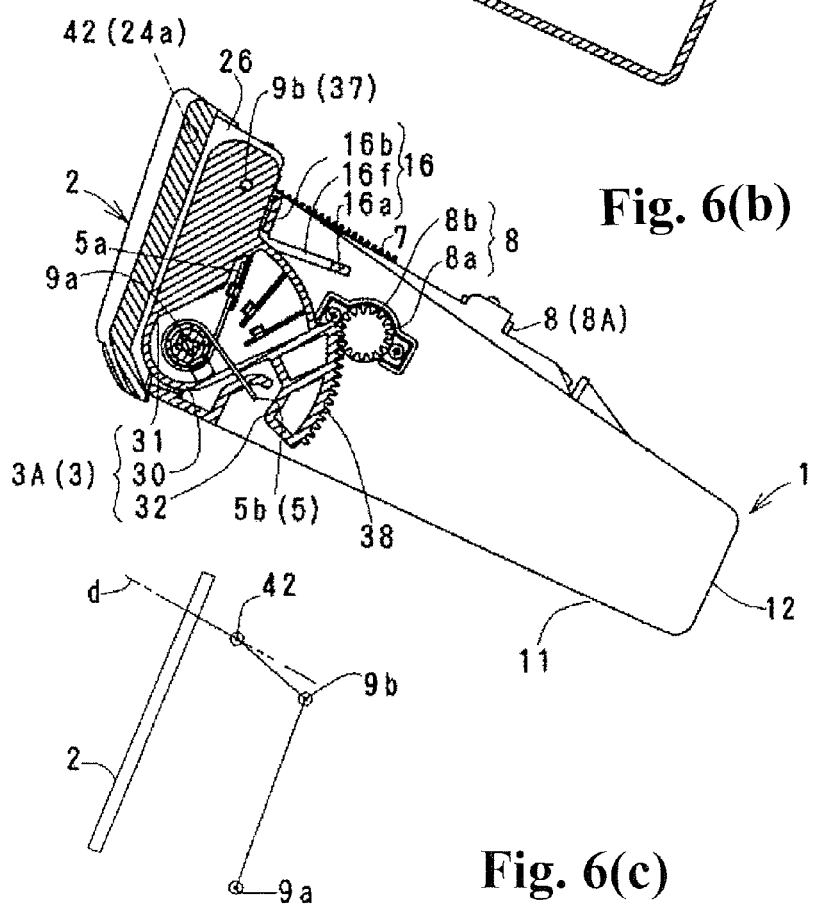
Fig. 6(b)
Fig. 6(c)

LID OPENING/CLOSING MECHANISM AND STORAGE DEVICE

CROSS-REFERENCE TO RELATED APPLICATION

This is a PCT National Phase of PCT/JP2012/065413 filed on Jun. 15, 2012, which claims the priority of Japanese Patent Application No. 2011-133878 filed on Jun. 16, 2011.

FIELD OF TECHNOLOGY

The present invention relates to a lid opening/closing mechanism switching a lid (including a door, a cover, a shield plate, and the like) between a closed position, which closes an opening portion on a base body side, and an open position, and a storage device.

BACKGROUND ART

For example, a storage device provided inside a vehicle interior is subjected to many restrictions of an opening/closing trajectory of the lid in relation to a panel shape near a placement portion, another member, articles, and the like so as to be required to turn the lid while approaching a base body as close as possible, or to turn the lid by controlling an amount of the lid projecting from the base body. As for a countermeasure, there are Patent Documents 1 and 2 in which the present applicant has previously developed.

FIGS. 9(a) and 9(b) are a mechanism of the Patent Document 1, wherein FIG. 9(a) shows a closed position of the lid, and FIG. 9(b) shows an open position of the lid. The reference numeral 2 represents a base body, and the reference numeral 3 represents a lid (a door). The lid 3 includes a support arm 32, a gear portion 32a provided in the arm 32, and a slide portion which is not shown in the figures and provided approximately in the center of an arc of the gear portion 32a. The base body 2 includes a first rack portion 11 engaging with the gear portion 32a provided approximately in parallel to each other, a guide groove 13 engaging with the aforementioned slide portion, and the like. In the aforementioned mechanism, opening and closing of the lid 3 have a trajectory accompanied by turning and moving motions of the lid 3 by a movement accompanied by an engagement of the gear portion 32a relative to the first rack portion 11 (an engagement of a gear, which is not shown in the figures, relative to a second rack portion 12), and an engagement of the slide portion relative to the guide groove 13. Also, in the mechanism, there are included a slider 4 slidably assembled relative to the base body 2, and connected to the lid 3; an urging device 5 urging the slider 4; and an engaging/disengaging mechanism portion locking the lid 3 in the closed position. The lid 3 is switched from the open position to the closed position against an urging force of the urging device 5 so as to be locked in the closed position thereof by the engaging/disengaging mechanism portion.

FIGS. 10(a) and 10(b) are a mechanism of the Patent Document 2, wherein FIG. 10(a) shows a closed position of the lid, and FIG. 10(b) shows an open position of the lid. The reference alphabet S or Sa represents a base body (a main body), the reference alphabet M or Ma represents a lid (a lid). In the mechanism, there are provided a base arm 1 assembled to the lid M with a first pivot support portion A, and assembled to a fixation body S with a second pivot support portion B; a control arm 2 assembled to the lid M with a third pivot support portion C, and including a slide portion 2b guided by a cam portion 4 provided in the fixation body S; and a support body 3 turnably provided in the fixation body S with a fourth pivot support portion D. The control arm 2 is assembled movably relative to the support body 3. The cam portion 4 includes a first portion 4a, and a second portion 4e which is continuous with the first portion 4a, and when the slide portion 2b of the control arm 2 is in the second portion 4e of the cam portion 4, the lid M is turned around the first pivot support portion A while changing distances of the third pivot support portion C and the fourth pivot support portion D. In short, opening and closing of the lid M are moved by a performance by four-joint links up to a predetermined forward-movement position, and after the lid M has reached the predetermined forward-movement position, a rotation motion around one axis is carried out. Also, in the mechanism, there are included a first urging device 5 providing a turning force around the second pivot support portion B to the base arm 1; an engaging/disengaging mechanism portion (comprising a latched portion and a latching portion operated by a button) which is not shown in the figures and locking the lid 3 in the closed position; and the like. The lid 3 is switched from the open position to the closed position against an urging force of the first urging device 5 so as to be locked in the closed position thereof by the engaging/disengaging mechanism portion.

PRIOR ART DOCUMENTS

Patent Documents

Patent Document 1: Japanese Unexamined Patent Application Publication No. 2007-138567
Patent Document 2: Japanese Unexamined Patent Application Publication No. 2009-154568

DISCLOSURE OF THE INVENTION

Problems to be Solved by the Invention

In the aforementioned respective mechanisms, compared to a configuration turning the lid around a pivot support portion which is positionally fixed, the lid can turn while approaching the base body as close as possible so as to control the amount of the lid projecting from the base body. However, in each mechanism, for example, in a case of the Patent Document 1, in relation to a requirement of an engagement between the rack portion and the gear portion, a processing accuracy and the like are required to thereby be difficult to reduce a production cost. Also, in a case of the Patent Document 2, there are required a space placing the base arm and the control arm, and a large space for providing the cam portion controlling a movement of the control arm on a base body side. Accordingly, from the aforementioned respects, they occasionally cannot be adopted.

The present invention has been developed from the aforementioned background. An object thereof is to provide a lid opening/closing mechanism and a storage device with a simplified configuration, which can expand the freedom of design relative to a lid opening/closing trajectory while controlling the space required on the base body side, and can facilitate an excellent opening/closing operability.

Means for Solving the Problems

In order to achieve the aforementioned object, a lid opening/closing mechanism according to the present invention, which switches a lid between a closed position closing an opening portion of a box-like base body, and an open position opening the aforementioned opening portion, includes an arm allowing a tip side thereof to turn to a front of the base body as a support point on a base end side pivotally supported at the base body by a first axis support portion, and connected to the lid turnably by a second axis support portion. The lid is turned in an opening direction or a closing direction in association with a turn of the aforementioned arm.

The lid opening/closing mechanism according to the present invention described above is preferable to be embodied as the following aspect. Namely, (1) the lid opening/closing mechanism has a configuration including a control member provided to be slidably placed in a guide portion provided in the base body, and turnably connecting a tip side to the lid through a third axis support portion, and in an opening/closing process of the lid, the second axis support portion moves to the front of the base body by the turn of the arm around the first axis support portion, and once the first axis support portion, the second axis support portion, and the third axis support portion are relatively lined up approximately in a straight line, the lid is reversely switched in the opening direction or the closing direction. Incidentally, "the lid is reversely switched in the opening direction or the closing direction" means that, for example, as shown in FIGS. 7(a) to 7(c), from a state wherein the first axis support portion 9a (12c), the second axis support portion 9b (26a), and the third axis support portion 42 (24a) are relatively lined up approximately in a straight line, the lid is switched in the closing direction as shown in FIGS. 6(a) to 6(c); or as shown in FIGS. 8(a) to 8(c), the lid is switched in the opening direction. According to the preferred aspect, firstly, the arm and the control member are not required to be directly connected or to be placed in parallel as in the case of the Patent Document 1 or 2, so that the arm and the control member can be placed in a different portion of the base body as an embodiment so as to expand the freedom of design from that respect. Also, in the mechanism of the present invention, the lid is switched in the closing direction or is switched in the opening direction from the state wherein the first axis support portion, the second axis support portion, and the third axis support portion are relatively lined up approximately in a straight line (hereinafter, called a switching mid-course position of the lid), so that if an urging device urging the control member such as the preferred aspect is provided, due to an urging force, the lid can be switched from a mid-course switching state to the closed position or the open position. Accordingly, an engaging/disengaging mechanism locking the lid in the closed position as in the case of the aforementioned respective Patent Documents becomes unnecessary as well.

(2) The aforementioned control member has a configuration reducing a protrusion amount of the lid to the front of the base body when the lid is in the closed position or the open position, and providing a maximum protrusion amount of the lid to the front of the base body when the lid is turned in the opening direction from the closed position or in the closing direction from the open position, where the first axis support portion, the second axis support portion, and the third axis support portion are relatively lined up approximately in a straight line. In the preferred aspect, an operational characteristic of the control member is clearly shown, and the control member reduces the protrusion amount to the front of the base body in the closed position or the open position of the lid, and the protrusion amount to the front of the base body becomes maximum in the aforementioned switching mid-course position of the lid. In this respect, for example, as for a reverse system of the lid as in the case of the preferred aspect, it is preferable for a case allowing the lid to be switched from the switching mid-course position to the closed position or the open position by the urging force.

(3) The configuration includes the urging device which accumulates the urging force in a process in which the control member increases the protrusion amount to the front of the base body, and allows the control member to move by the urging force thereof in a process in which the control member reduces the protrusion amount to the front of the base body. According to the preferred aspect, the lid is operated to turn against the urging force (accumulating the urging force) of the urging device from the open position or the closed position up to the switching mid-course position, and the lid can be turned from the switching mid-course position to the closed position or the open position by the urging force of the urging device so as to improve usability.

(4) The configuration includes a damping device damping a slide of the control member. According to the preferred aspect, the control member slides slowly by the damping device, so that through the control member, an opening/closing speed of the lid can be also absorbed so as to provide a feeling of a high grade.

(5) The configuration includes the urging device provided near the first axis support portion, and accumulating the urging force in a process in which the arm is turned and the tip side moves to the front of the base body. According to the preferred aspect, the arm is urged in the open position of the lid by the urging device so as to prevent the arm from wobbling unexpectedly especially in the open position of the lid. Thereby, the lid can be held in a stable state as well.

(6) The configuration includes the damping device damping the turn of the arm. According to the preferred aspect, since the arm is turned slowly by the damping device, the opening/closing speed of the lid through the arm can be absorbed as well so as to provide the feeling of the high grade.

(7) In the configuration, the arm is placed at least in one side portion of both side portions of the base body in the closed position of the lid, and the control member is placed in one of the top and bottom faces of the base body. According to the preferred aspect, for example, even if the base body has a flattened box shape compared to the Patent Document 1 or 2, an adaptation can be facilitated.

Also, in order to achieve the aforementioned object, a storage device according to the present invention specifies a usage example of the lid opening/closing mechanism according to the present invention. In the storage device provided in a buried state relative to a panel portion wherein the box-like base body has been stood up or has been obliquely risen, and placing the opening portion approximately horizontally or obliquely, the storage device includes the lid opening and closing the opening portion, and switches the lid by the lid opening/closing mechanism according to the present invention.

Effect of the Invention

In the lid opening/closing mechanism according to the present invention, the lid is turned while the arm is turning the tip side to the front of the base body around the first axis support portion on a base body side so as to easily resolve an interference of the arm relative to the base body. Also, in a state wherein the lid has been connected relative to the arm turned as a support point of the first axis support portion through the second axis support portion, and has been moved in a front direction of the base body, the lid can be switched to the open position as a support point of the second axis support portion thereof. Consequently, in the mechanism of the present invention, compared to a conventional configuration wherein the lid is turned around a pivot support portion which is positionally fixed, in the open position of the lid, in proportion to the second axis support portion moving to the front of the base body by the turn of the arm, a height relative to the base body can be kept low.

Also, the storage device according to the present invention can fulfill an advantage of the lid opening/closing mechanism according to the invention as the storage device wherein the base body is provided in the buried state relative to the panel portion wherein the base body has been stood up or has been obliquely risen, and the opening portion is placed approximately horizontally or obliquely.

BRIEF DESCRIPTION OF THE DRAWINGS

FIGS. 6(a) to 6(c) are a cross-sectional view taken along a line A-A in FIG. 3(a), a cross-sectional view taken along a line B-B in FIG. 3(a), and a fundamental operational view, showing the lid opening/closing mechanism of the storage device in the closed position of the lid.

BEST MODES OF CARRYING OUT THE INVENTION

Figure 1:
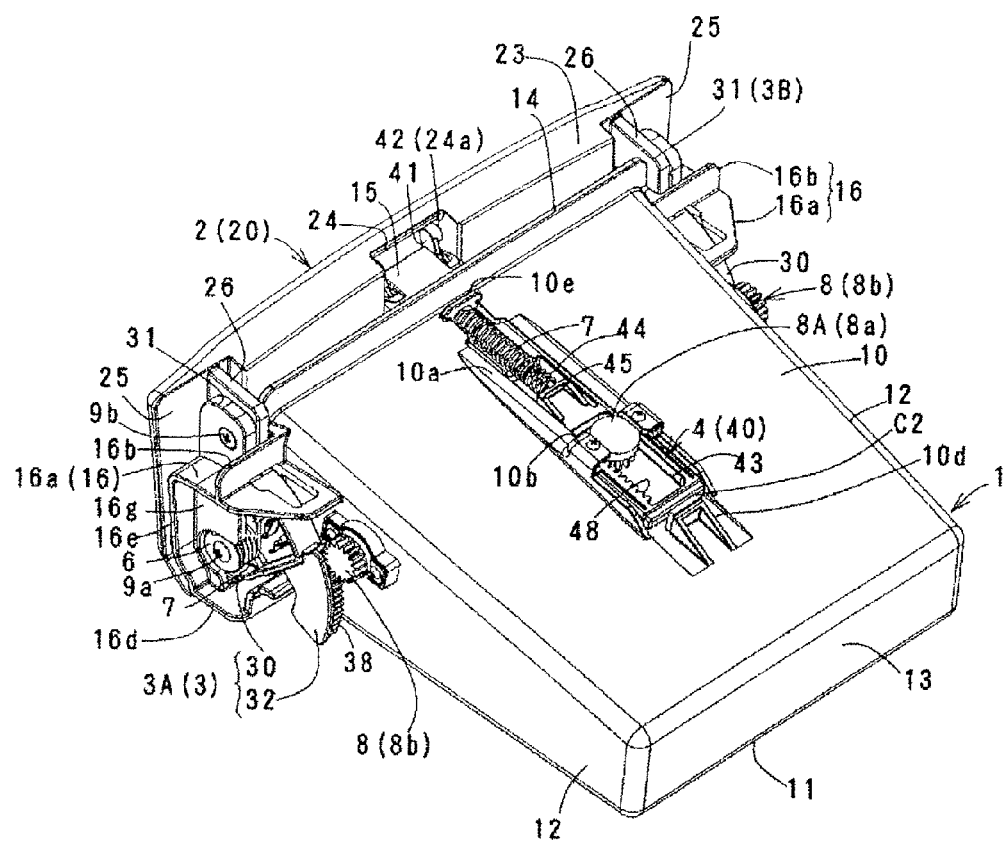
FIG. 1 is a schematic perspective view showing a storage device and a lid opening/closing mechanism of an embodiment of the present invention in a closed portion of a lid viewed from a back face side.

Hereinafter, a lid opening/closing mechanism and a storage device of an embodiment according to the present invention will be explained with reference to drawings. In the explanation, the storage device, the lid opening/closing mechanism, and an operation thereof will be described in detail in that order. Incidentally, in FIG. 3(a) to FIG. 4(b), each (a) represents a top view viewed from a Z direction in each (b).

(Storage device) In the storage device of an illustrative embodiment, a box-like base body 1 includes an opening portion on a front face or a front side, and the opening portion is opened and closed by a lid 2. In an arrangement characteristic, it is equipped in a center console or an instrument panel (for example, a concave portion provided approximately in an intermediate position of a vehicle width) inside a vehicle interior in a buried state. However, as for an installation portion, the storage device can be embedded in one portion such as, for example, an armrest and the like. Also, as for the box-like base body 1, an inside portion and an exterior appearance are variously changed in accordance with a purpose of use provided that there are included placement portions for the opening portion corresponding to the lid 2, the later-described arm 3, a control member 4, and the like. The opening portion of the base body 1 may be provided only with a requirement of being opened and closed by a turn of the lid 2. A lid switched between a closed position and an open position relative to the opening portion of the base body 1 by the turn is an object for the lid 2. Then, the lid opening/closing mechanism switches the lid 2 between the closed position and the open position relative to the opening portion of the base body 1 by the turn, and comprises the arm 3, the control member 4, an urging member 5, a coil spring 7, and the like. As for a material, although all of the base body 1, the lid 2, the arm 3, and the control member 4 are resin formed components, they may be made of other than resin.

Figure 2:
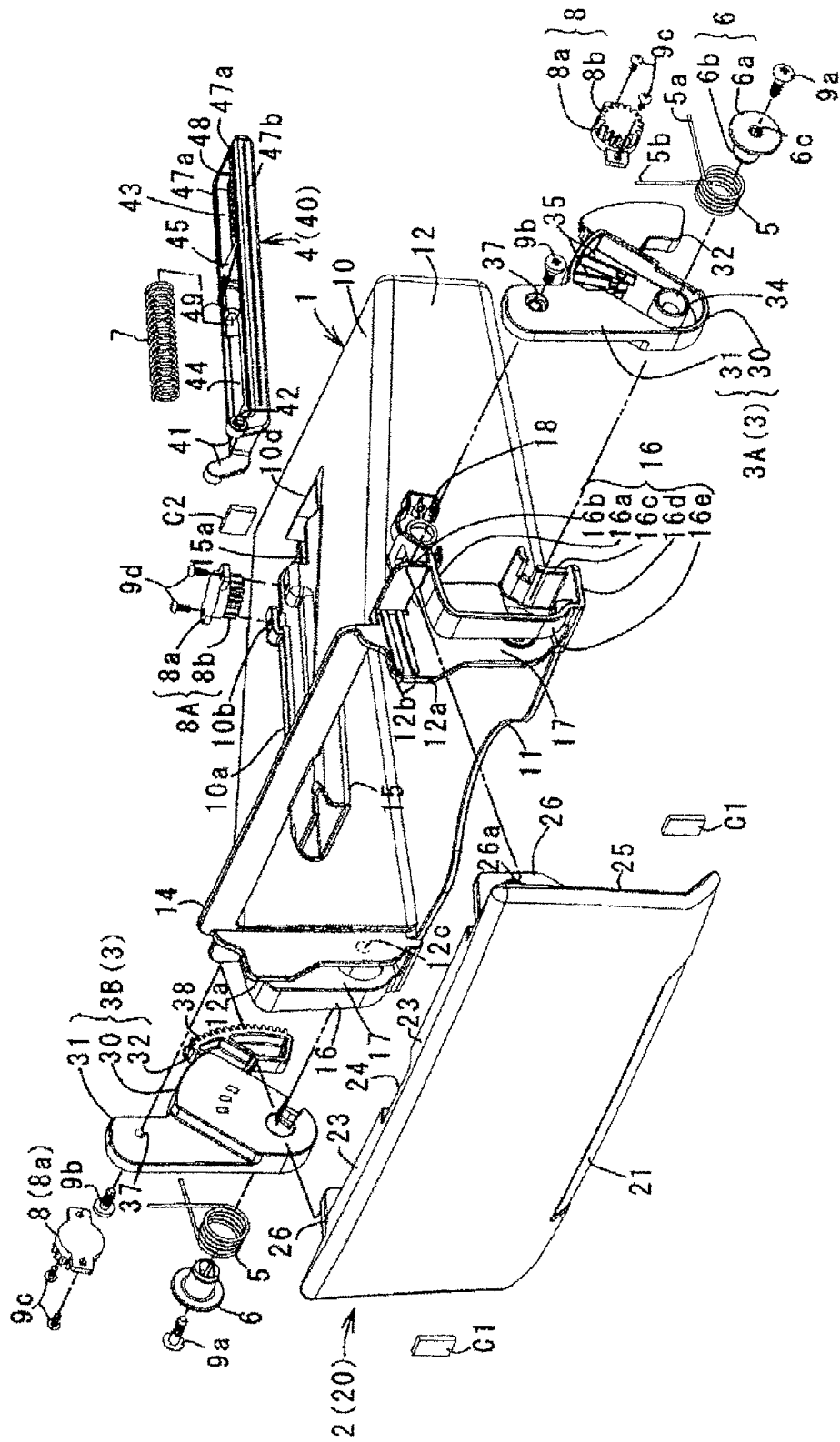
FIG. 2 is a schematic exploded view showing a structure member of the storage device and the lid opening/closing mechanism.

First, a detailed configuration of the base body 1 and the lid 2 will be clearly explained. In the base body 1, as shown in FIG. 1 and FIG. 2, the inside portion is partitioned by a top face 10, a bottom face 11, both side faces 12, and a back face 13 so as to form a container shape having the opening portion on a near side. In the top face 10, there are provided a standing wall 14 partitioning the opening portion and protruded on an upper edge; and a cylindrical guide portion 15 connected to an intermediate part between right and left of an inner face. The guide portion 15 is a portion guiding a slide of the control member 4, is protruded forward from the opening portion for a predetermined length, and forms a groove portion 15a having a cross-sectional surface of a U shape by lacking an upper portion behind the standing wall 14. In the vicinity of the groove portion 15a, there are provided both side walls 10a standing up on the top face 10; attachment portions 10b protruded on a top end face of each side wall 10a; a back wall 10d standing up on a back side of the groove portion 15a; and a control piece 10e standing up just before the standing wall 14. In the attachment portions 10b on both sides, there is attached the later-described damper 8A. The reference alphabet and numeral C2 represents a buffer cushion attached on an inner end face of the back wall 10d.

In both side faces 12, there are provided a front protruding wall 12a protruding forward from the top and bottom faces 10 and 11; a support portion 16 partitioning an arm placement space 17 between the front protruding wall 12a and the support portion 16; and a damper attachment portion 18 placed on a back side more than each support portion 16. Among those, in the front protruding wall 12a, there is provided a plurality of ribs 12b protruding so as to improve a movement of the arm 3. The support portion 16 comprises an upper horizontal wall 16a, an upper partition wall 16b, a lower back vertical wall 16c, a lower horizontal wall 16d, a front vertical wall 16e, and an opposed wall 16g (see FIG. 1) integrated with the upper horizontal wall 16a and the front vertical wall 16e, and opposed to the front protruding wall 12a so as to form the placement space 17 opening in a front-back direction between each front protruding wall 12a and the support portion 16. In the attachment portion 18, there is attached a damper 8. Incidentally, the damper 8 and the aforementioned damper 8A comprise a well-known rotary damper, and include a main body 8a; an output axis turning while receiving a resistance such as an operating oil and the like; and a rotational gear 8b mounted on the output axis. Then, the damper 8 is mounted on the attachment portion 18 by a screw 9c. The aforementioned damper 8A is mounted on each attachment portion 10b by a screw 9d.

On the other hand, as shown in FIG. 1 or FIG. 2, the lid 2 comprises approximately a rectangular plate material having a size covering the opening portion and the standing wall 14 of the base body 1, and the support portions 16 on both sides from a front. The lid 2 forms an operating grip portion 21 located on a lower side of a design face 20 and partitioned by a shallow groove; an intermediate portion 24 between right and left located on an upper side of a back face; and a thick portion 23 thickening for one step except for both side portions 25. The intermediate portion 24 has a concave shape allowing connection piece portions 41 of the control member 4, which slides along a front cylinder portion of the guide portion 15 and an inside of the guide portion 15, to pass through. Also, as shown in FIG. 6(a), the intermediate portion 24 forms an axis hole 24a on an opposed inner end face having a concave shape. On both side portions 25, there are provided connection piece portions 26 which are inserted into the placement spaces 17 on the aforementioned base body side. Each connection piece portion 26 includes an attachment hole 26a allowing to be connected to an axis hole 37 for the arm 3 through a screw 9b. The reference alphabet and numeral C1 represents a buffer cushion attached on a lower side of both side portions 25.

(Lid opening/closing mechanism) The aforementioned lid 2 is switched between the closed position closing the opening portion of the base body 1 and the open position opening the aforementioned opening portion by the lid opening/closing mechanism of the present invention. The lid opening/closing mechanism comprises the arm 3 allowing a tip side to turn to a front of the base body as a support point on a base end side pivotally supported at the base body 1 by a screw 9a which is a first axis support portion, and connected to the lid 2 turnably by the screw 9b which is a second axis support portion; and the control member 4 provided to be slidably placed in the guide portion 15 on the base body side, and turnably connecting the connection piece portion 41 on the tip side to the lid 2 through an axis portion 42 which is a third axis support portion. Then, an operational characteristic is that in an opening/closing process of the lid 2, the screw 9b which is the second axis support portion moves to the front of the base body by a turn of the arm 3 around the screw 9a (an axis hole 34) which is the first axis support portion, and once the screw 9a (the axis hole 34) which is the first axis support portion, the screw 9b (the axis holes 37 and 26a) which is the second axis support portion, and the axis portion 42 (the axis hole 24a) which is the third axis support portion, are relatively lined up approximately in a straight line, the lid 2 is reversely switched in the opening direction or the closing direction. Hereinafter, the detailed configuration will be clearly described.

First, the arm 3 comprises a right-side arm 3A and a left-side arm 3B, which are symmetrically shaped, and each arm 3 includes a base end portion 30 on a lower side; a connection piece portion 31 standing up from the base end portion 30; and a guide portion 32 extending in an arc shape on a back lower side from the base end portion 30. The base end portion 30 forms the cylindrical axis hole 34 on a lower side, and a plurality of spring locking portions 35 on an upper side. The connection piece portion 31 forms the axis hole 37 on a tip side. The guide portion 32 forms a tooth portion 38 continuous with an outer circumference.

Figure 3A:
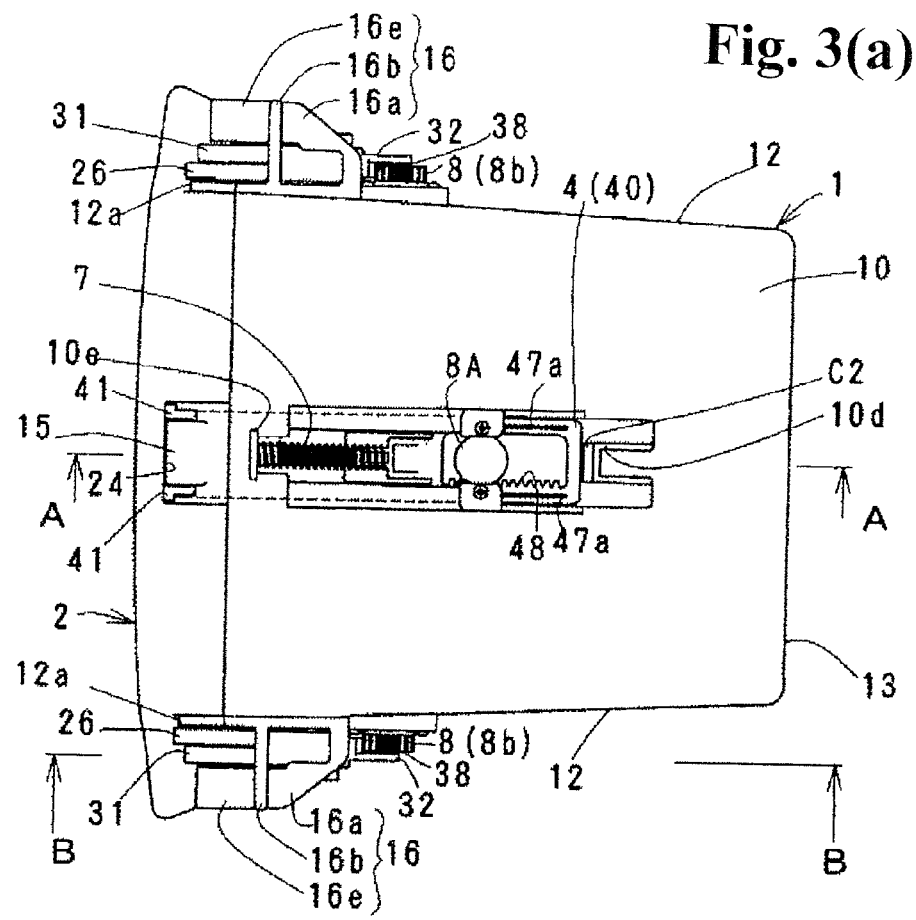
FIGS. 3(a) and 3(b) are a top view and a side view showing the storage device in the closed position of the lid.
Figure 3B:
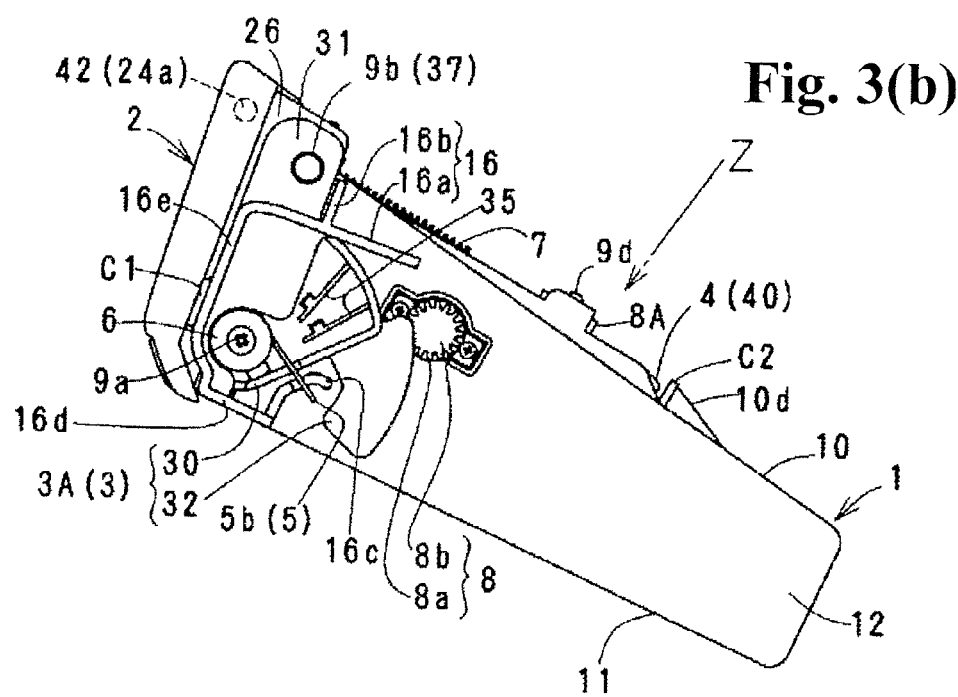
Figure 4A:
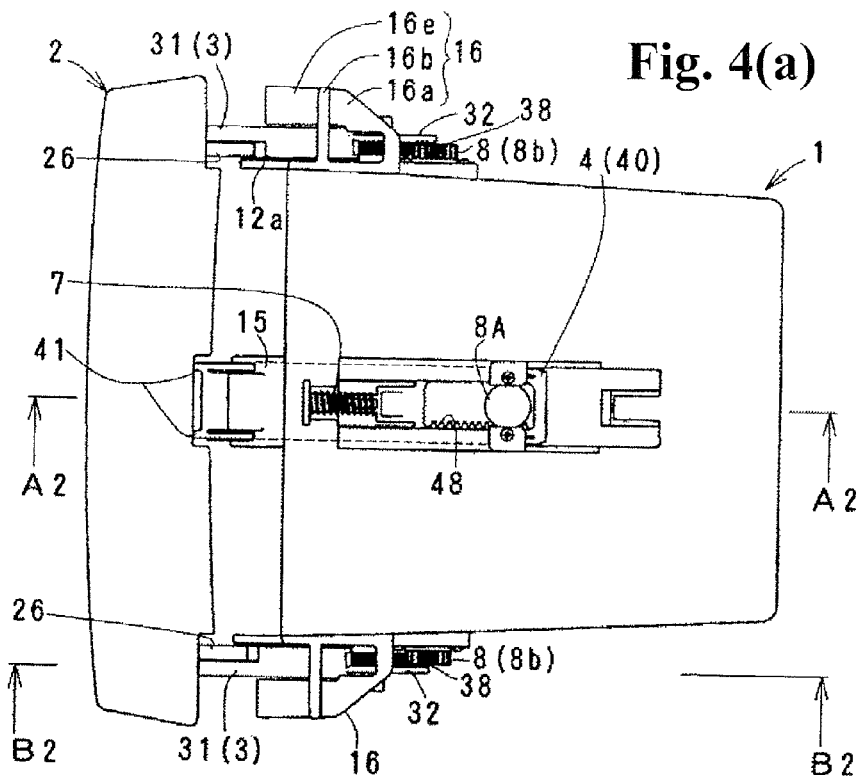
FIGS. 4(a) and 4(b) are a top view and a side view showing the storage device in a switching mid-course position of the lid.
Figure 4B:
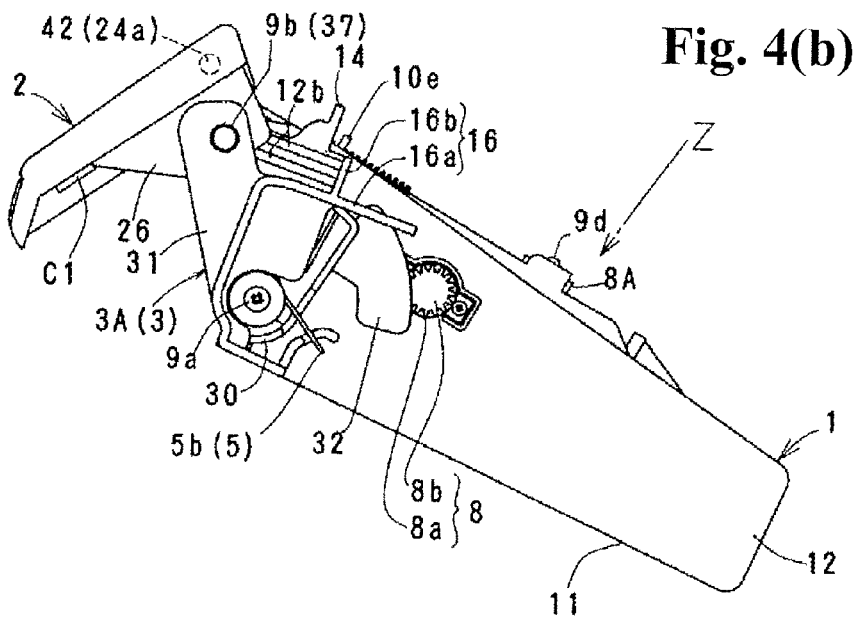
Figure 5A:
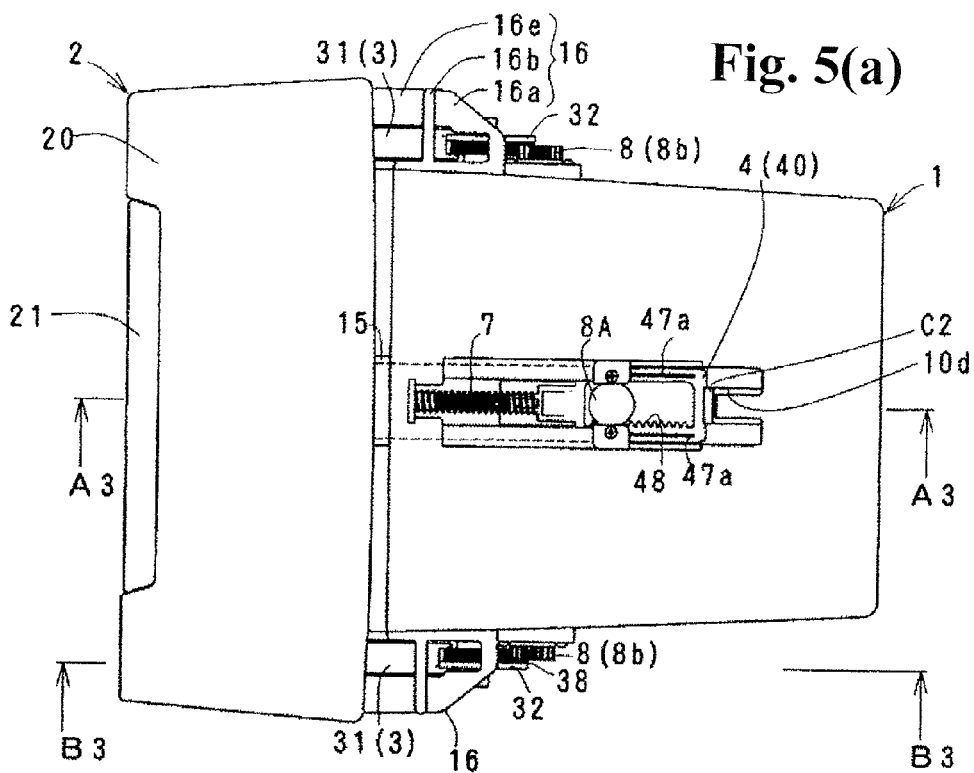
FIGS. 5(a) and 5(b) are a top view and a side view showing the storage device in an open position of the lid.
Figure 5B:
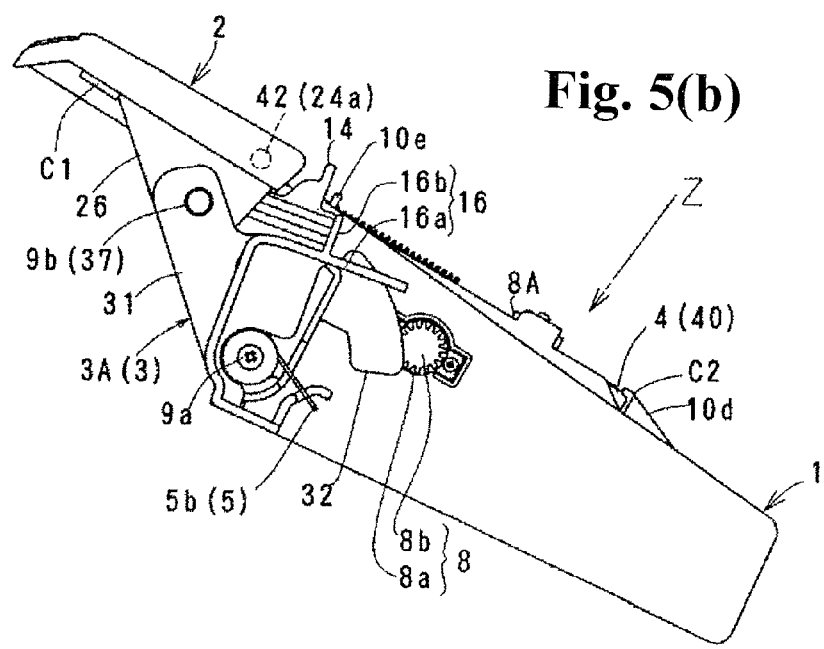
Figure 7A:
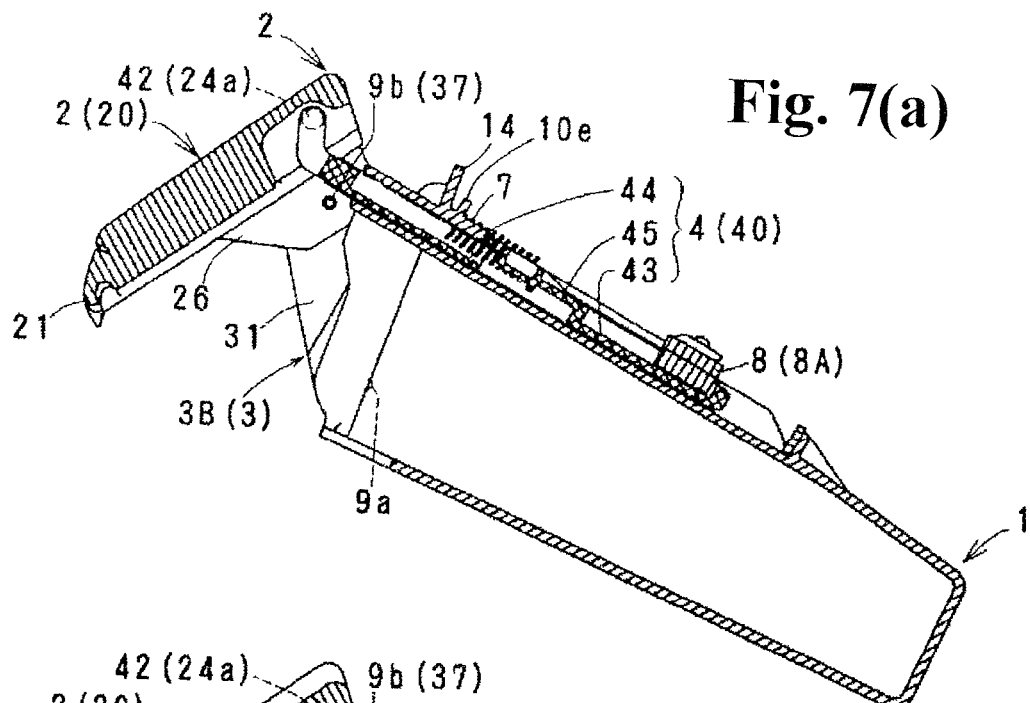
FIGS. 7(a) to 7(c) are a cross-sectional view taken along a line A2-A2 in FIG. 4(a), a cross-sectional view taken along a line B2-B2 in FIG. 4(a), and a fundamental operational view, showing the lid opening/closing mechanism of the storage device in the switching mid-course position of the lid.
Figure 7B:
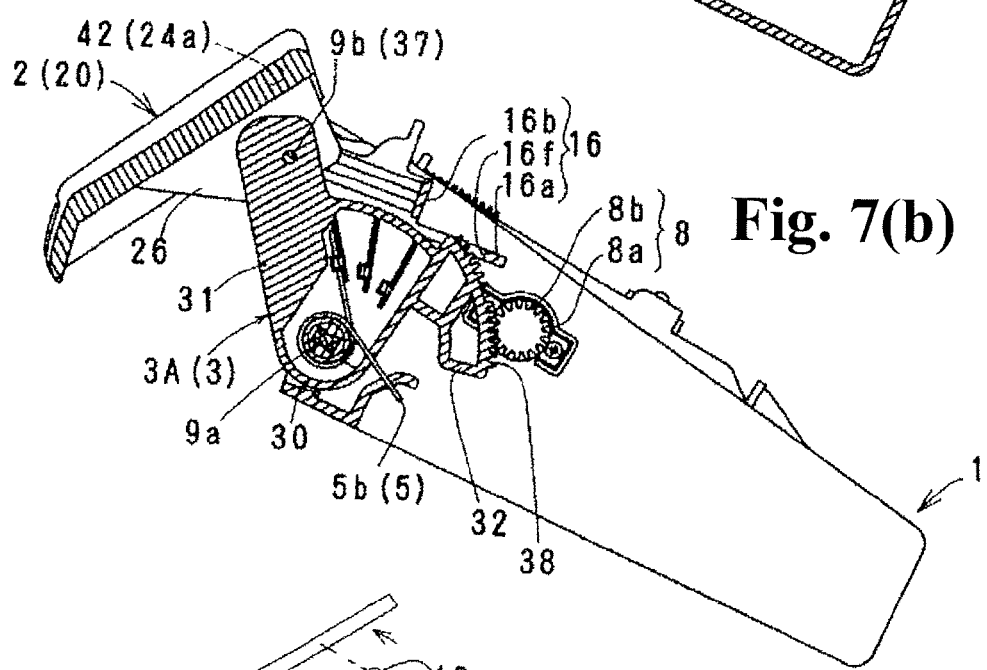
Figure 7C:
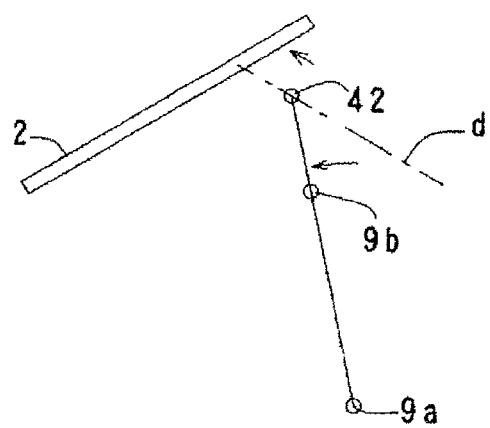

The aforementioned arm 3 can be switched between a stand-up state (the closed position of the lid), wherein after the arm 3 is placed in the placement place 17, the screw 9a is locked in a corresponding portion of the front protruding wall 12a through a collar 6 and the axis hole 34 so that the arm 3 is pivotally supported turnably only for a predetermined angle relative to the base body 1, and the connection piece portion 31 abuts against the upper partition wall 16b as shown in FIGS. 3(a) and 3 (b); and a tilt state (a switching mid-course position and the open position of the lid), wherein as shown in FIGS. 4(a) and 4(b), and FIGS. 5(a) and 5(b), the arm 3 is turned as a support point of the screw 9a which is the first axis support portion, and the tip side is moved to the front of the base body.

In the example, the tooth portion 38 of the guide portion 32 is engaged with the rotational gear 8b of the aforementioned damper 8. Consequently, the arm 3 receives a braking action of the damper 8 so as to be switched between the stand-up state and the tilt state while being turned slowly. Also, the lid 2 is turnably connected and supported as a support point of the screw 9b relative to each connection piece portion 31 of the arms 3A and 3B in a state wherein the screw 9b which is the second axis support portion is engaged with the axis hole 26a from the axis hole 37.

Incidentally, the aforementioned collar 6 comprises a head portion 6a and a cylinder portion 6b, and includes an axis hole 6c passing the screw 9a through at the center. The head portion 6a retains a torsion spring 5 which is supported in a cylindrical portion forming the axis hole 34. As shown in FIG. 6(b), in the torsion spring 5, one end 5a of a winding portion is locked in the spring locking portion 35 of the base end portion 30, and the other end 5b is latched onto and locked in a notch portion provided in the lower back vertical wall 16c. In the operation, the arm 3 is switched from the aforementioned stand-up state to the tilt state against an urging force so as to eliminate looseness of the arm 3, and to prevent wobbling or to allow the arm 3 to be successfully switched from the tilt state to the stand-up state.

On the other hand, the control member 4 comprises a slender flat plate portion 40 fitted into a cylinder portion of the guide portion 15 and the groove portion 15a; and a pair of arm portions 41 protruded obliquely upward on a front end face of the flat plate portion 40. Each arm portion 41 includes the axis portion 42 fitted into the axis hole 24a on the aforementioned lid side on the same axis line. In the flat plate portion 40, there are provided a back-side concave portion 43 and a front-side concave portion 44 by clamping a divider portion 45 approximately in the middle. Also, the flat plate portion 40 includes ribs 47a and 47b provided on a top face partitioning the concave portion 43 and the concave portion 44, and both side faces (see FIG. 2, and FIGS. 5(a) and 5(b)). In the concave portion 43, there is provided a tooth portion 48 continuous with an internal face on one side. In the concave portion 44, a spring support axis 49 provided to stand in the divider wall 45 is protruded forward. The ribs 47a and 47b extend in a front-back direction so as to facilitate the slide of the control member 4.

For example, the aforementioned control member 4 is slidably placed in the guide portion 15 by inserting the flat plate portion 40 into the cylinder portion of the guide portion 15. Also, the control member 4 is urged backward, i.e., in a direction reducing a protrusion amount to the front of the base body by the coil spring 7 which is an urging device. The coil spring 7 is placed in a state wherein a back end side is supported in the support axis 49, and a front end side abuts against the control piece 10e. In a process in which the control member 4 is slid in a direction increasing the protrusion amount to the front of the base body, the coil spring 7 accumulates urging forces, and due to the accumulated urging forces thereof, the coil spring 7 allows the control member 4 to slide backward.

Also, in the control member 4, the axis portion 42 is turnably connected to the axis hole 24a of the lid, and when the lid 2 is in the closed position or the open position, the control member 4 reduces the protrusion amount to the front of the base body to a minimum. In a process in which the lid 2 is turned in the opening direction from the closed position or in the closing direction from the open position, i.e., the lid 2 comes to the aforementioned switching mid-course position, the control member 4 slides so as to have a maximum protrusion amount to the front of the base body while accumulating the urging forces in the coil spring 7. In that mechanism, once the screw 9a which is the first axis support portion, the screw 9b which is the second axis support portion, and the axis portion 24a which is the third axis support portion, are relatively lined up approximately in a straight line by the slide of the control member 4 thereof, and the lid 2 is lined up in a straight line thereof, so that the lid 2 is reversely switched in the opening direction or the closing direction. Also, in that mechanism, the tooth portion 48 has been engaged with the rotational gear 8b of the aforementioned damper 8A, and the control member 4 is slowly slid by receiving a braking action of the damper 8A.

(Operation) Next, a main operation when the lid is opened and closed by the aforementioned lid opening/closing mechanism will be explained.

(1) FIG. 1, FIGS. 3(a) and 3(b), and FIGS. 6(a) to 6(c) show a state in the closed position, wherein the lid 2 closes the opening portion of the base body. In that state, the control member 4 abuts against the cushion C2 by the urging force of the coil spring 7 to form a situation wherein the slide to a back side of the guide portion has been controlled. Also, the arm 3 abuts against the upper partition wall 16b to form a stand-up situation wherein a turn to a back side has been controlled. As shown in a fundamental view of FIG. 6(c), in the lid 2, the axis portion 42 (and the axis hole 24a) comprising the third axis support portion is positioned forward relative to a straight line connecting between the screw 9a (and the axis hole 34) comprising the first axis support portion and the screw 9b (and the axis holes 37 and 26a) comprising the second axis support portion. Also, the lid 2 is held by the control member 4, which has been slid and urged backward by the coil spring 7, so as not to wobble unexpectedly. Consequently, that mechanism does not require an engaging/disengaging mechanism which locks or holds the lid in the closed position as in the case of the Patent Document 1 or 2 so as to be simplified.

(2) FIGS. 4(a) and 4(b), and FIGS. 7(a) to 7(c) show a state wherein the lid 2 is in the aforementioned switching mid-course position. Namely, the lid 2 is operated to turn in the opening direction which is the aforementioned switching mid-course position by gripping the grip portion 21. In that turning process, accompanied by the lid 2 turned in the opening direction as the support point of the screw 9b, firstly, the arm 3 is turned or tilted to the front of the base body, i.e., in a direction separating from the upper partition wall 16b as the support point of the screw 9a against an urging force of the torsion spring 5, and at the same time, the control member 4 slides forward against the urging force of the coil spring 7 (accumulating the urging forces). As a result, as shown in a fundamental view of FIG. 7(c), the lid 2 comes to the switching mid-course position in the same drawing wherein the axis portion 42 (and the axis hole 24a) comprising the third axis support portion is lined up approximately in a straight line with the screw 9a (and the axis hole 34) comprising the first axis support portion and the screw 9b (and the axis holes 37 and 26a) comprising the second axis support portion. Then, when the lid 2 is operated to turn in the opening direction or the closing direction from the switching mid-course position thereof only for a slight amount, after that, the control member 4 is moved backward by the urging forces accumulated in the coil spring 7, so that the lid 2 is automatically switched to the open position or the closed position.

Figure 8A:
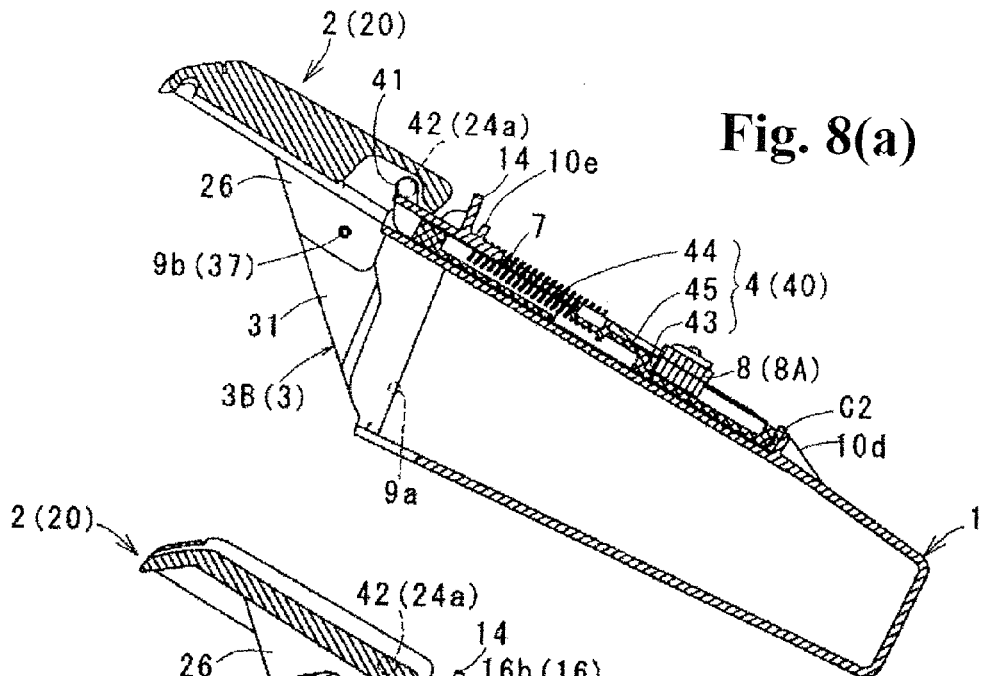
FIGS. 8(a) to 8(c) are a cross-sectional view taken along a line A3-A3 in FIG. 5(a), a cross-sectional view taken along a line B3-B3 in FIG. 5(a), and a fundamental operational view, showing the lid opening/closing mechanism of the storage device in the open position of the lid.
Figure 8B:
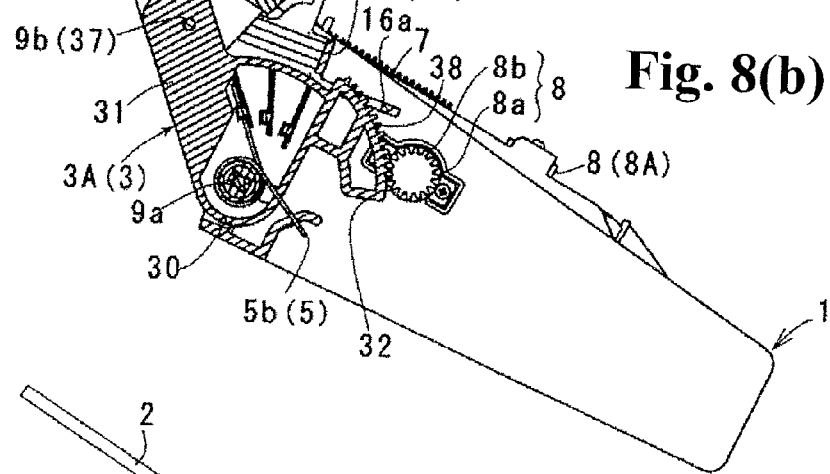
Figure 8C:
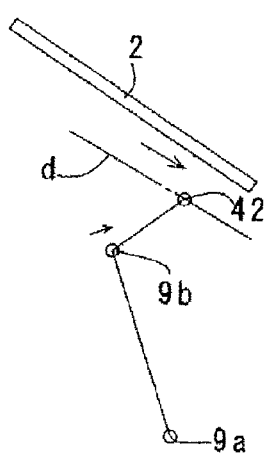
Figure 9A:
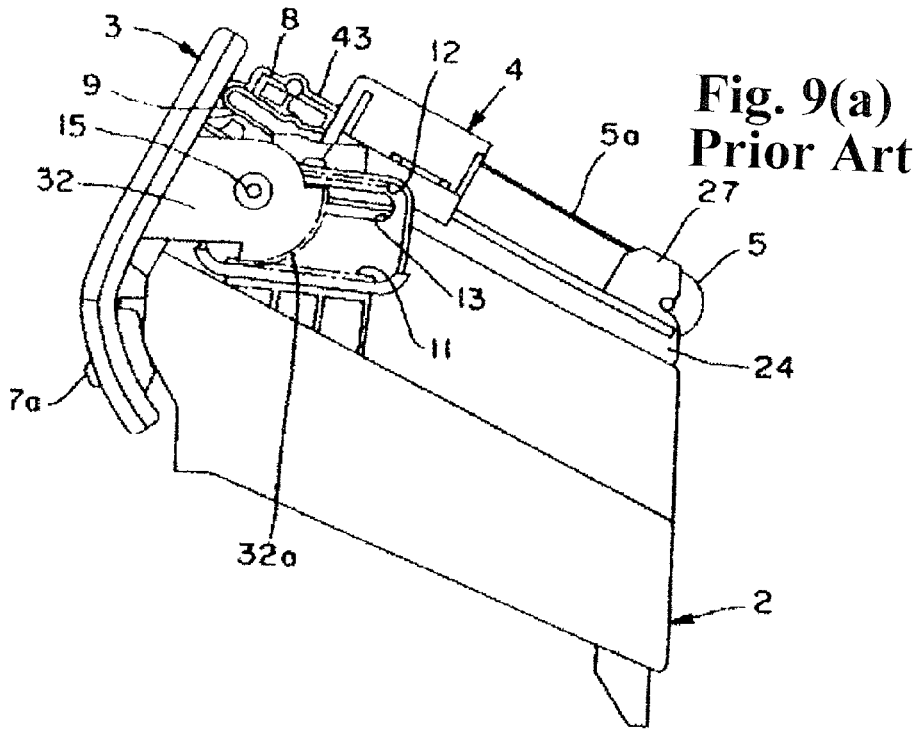
FIGS. 9(a) and 9(b) are explanatory views for explaining essential parts of Patent Document 1.
Figure 9B:
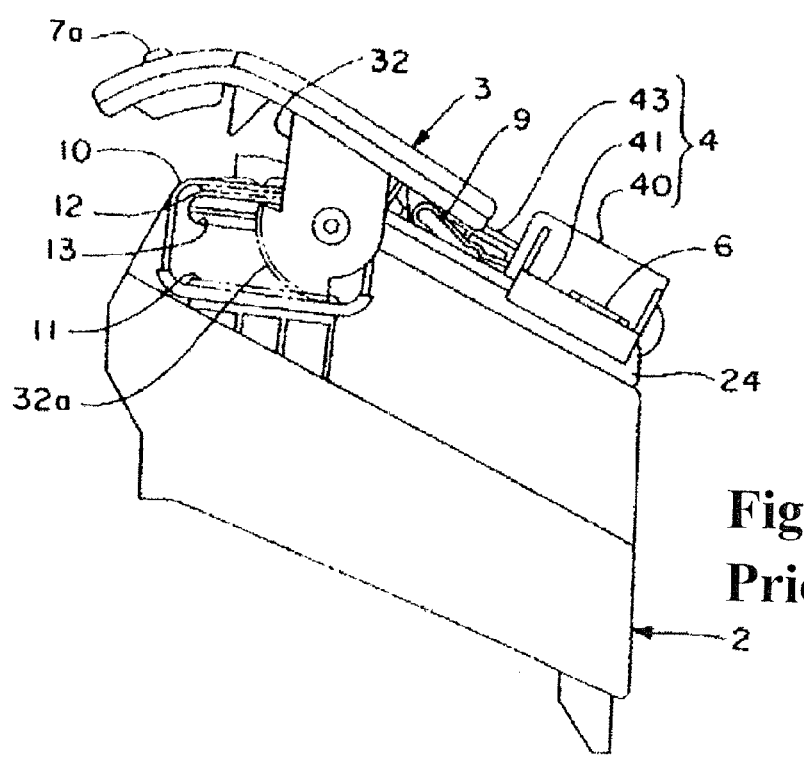
Figure 10A:
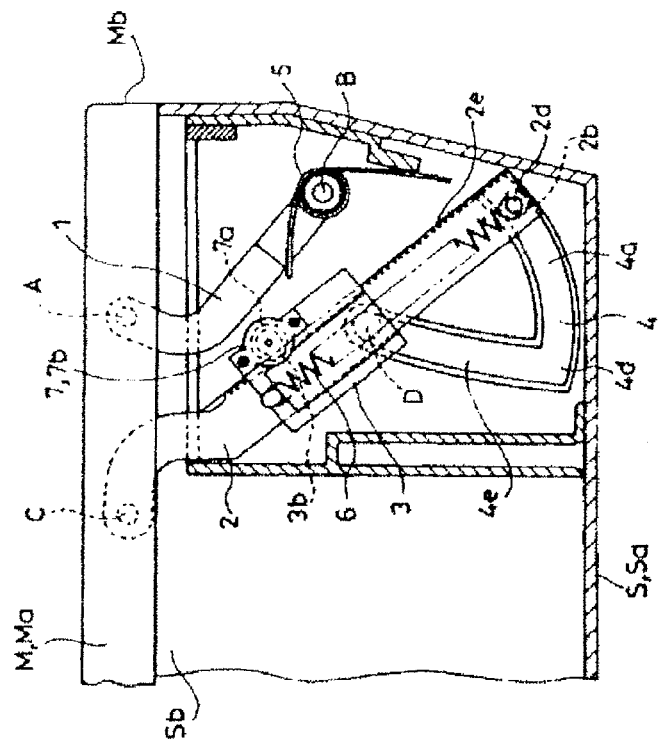
FIGS. 10(a) and 10(b) are explanatory views for explaining essential parts of Patent Document 2.
Figure 10B:
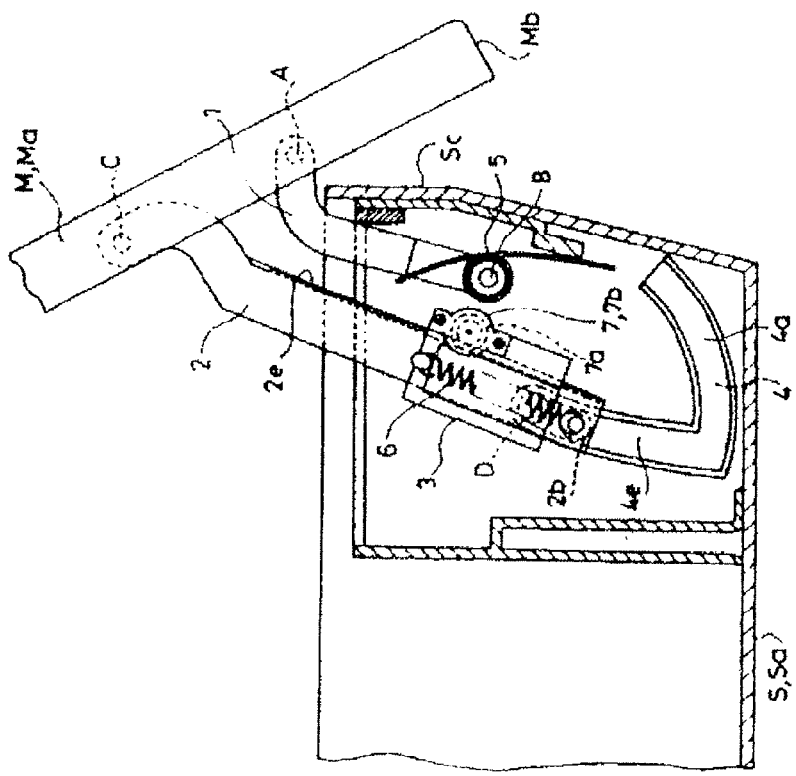

(3) When the lid 2 is switched to the closed position, the arm 3 and the control member 4 come to the aforementioned situations, so that the lid 2 is stably held in the closed position. On the other hand, FIGS. 5(a) and 5(b), and FIGS. 8(a) to 8(c) show a state wherein the lid 2 has been switched to the open position in which the opening portion of the base body is fully open. In that state, the arm 3 maintains the turned or tilted situation to the front of the aforementioned base body, i.e., in the direction separating from the upper partition wall 16b, and the control member 4 abuts against the cushion C2 by the urging force of the coil spring 7 so as to be in the state wherein the slide to the back side of the guide portion has been controlled. Consequently, as shown in a fundamental view of FIG. 8(c), in the lid 2, the axis portion 42 (and the axis hole 24a) comprising the third axis support portion is positioned backward relative to a straight line connecting between the screw 9a (and the axis hole 34) comprising the first axis support portion and the screw 9b (and the axis holes 37 and 26a) comprising the second axis support portion. Also, the lid 2 is stably held by the control member 4, which has been slid and urged backward by the coil spring 7, so as not to wobble unexpectedly. Also, in the aforementioned lid opening/closing mechanism, as shown in FIG. 6(a) with dashed lines, compared to a conventional configuration wherein the lid is turned around a pivot support portion which is positionally fixed, in the open position of the lid 2, the second axis support portion 9b (26a) moves to the front of the base body by the turn of the arm 3, so that as shown in FIGS. 8(a) to 8(c), a height of the lid 2 relative to the base body 1 can be kept low. In that example, in the open position, the lid 2 is placed close to the base body 1 for a portion corresponding to a height of the standing wall 14.

(4) In a case wherein the lid 2 is switched from the open position to the closed position again, when the lid 2 is operated to turn in the opening direction which is the aforementioned switching mid-course position by griping the grip portion 21, the lid 2 is turned in the closing direction as the support point of the screw 9b so as to reach the aforementioned switching mid-course position. After that, when the lid 2 is operated to turn in the closing direction from the switching mid-course position thereof only for the slight amount, the control member 4 is moved backward by the urging force accumulated in the coil spring 7, so that the lid 2 is automatically switched to the closed position. Naturally, in the aforementioned lid opening/closing mechanism, there is included the damper 8A damping a movement of the control member 4, or there is included the damper 8 damping the movement of the arm 3, so that through the control member 4 and the damper 8A, or through the arm 3 and the damper 8, an opening/closing speed of the lid 2 is absorbed so as to provide a feeling of a high grade for a lid switching operation.

Incidentally, in the present invention, details can be variously modified as necessary provided that they comprise a configuration specified in the first aspect. For example, in place of the configuration wherein the lid is turned in an upper direction so as to be switched to the open position, the base body and the lid may be placed reversely in top and bottom, so that a configuration wherein the lid is turned in a lower direction so as to be switched to the open position may be used. Also, as for a damping device, in place of the damper, a friction type may be used. As for the first, the second, and the third axis support portions, a shaft or a convex portion, and additionally, another pivot-support-portion configuration may be used other than the screw or the axis portion.

Incidentally, all contents of the specification, claims, drawings, and abstract of Japanese Patent Application No. 2011-133878 filed on Jun. 16, 2011 are cited in their entireties herein and are incorporated as a disclosure of the specification of the present invention.

What is claimed is:

1. A lid opening/closing mechanism for switching a lid between a closed position closing an opening portion of a base body, and an open position opening the opening portion, comprising:
   an arm allowing a tip side thereof to turn to a front of the base body as a support point with a base end side thereof pivotally supported at the base body by a first axis support portion, and connected to the lid turnably by a second axis support portion, and
   a control member provided to be slidably placed in a guide portion provided in the base body, and turnably connected at a tip side to the lid through a third axis support portion,
   wherein the lid is turned in an opening direction or a closing direction in association with a turn of the arm,
   in an opening/closing process of the lid, the second axis support portion moves the lid to the front of the base body by the turn of the arm around the first axis support portion, and
   the arm is arranged to turn the lid toward the closing direction when the lid is disposed at a position between the closed position and a switching mid-course position in which the first, second and third axis support portions are relatively lined up approximately in a straight line when viewed parallel to hinging axes of the first axis support portion, second axis support portion and third axis support portion, and to turn the lid toward the opening direction when the lid is disposed at a position between the open position and the switching mid-course position.

2. A lid opening/closing mechanism according to claim 1, wherein the control member reduces an amount of protrusion of the lid toward the front of the base body when the lid is in the closed position or the open position, and has a maximum amount of protrusion of the lid toward the front of the base body when the lid is turned in the opening direction from the closed position or in the closing direction from the open position, and the first axis support portion, the second axis support portion, and the third axis support portion are relatively lined up approximately in the straight line.

3. A lid opening/closing mechanism according to claim 1, further comprising an urging device accumulating an urging force in a process in which the control member increases an amount of protrusion of the lid to the front of the base body, and allowing the control member to move by the urging force thereof in a process in which the control member reduces the amount of protrusion of the lid toward the front of the base body.

4. A lid opening/closing mechanism according to claim 1, further comprising an urging device provided near the first axis support portion, and accumulating an urging force in a process in which the arm is turned so as to move the tip side to the front of the base body.

5. A lid opening/closing mechanism according to claim 1, further comprising a damping device damping the turn of the arm.

6. A storage device provided in a buried state relative to a panel portion wherein the base body has been stood up or has been obliquely risen and the opening portion is placed approximately horizontally or obliquely, comprising:
   the lid which opens and closes the opening portion, the lid being switched by the lid opening/closing mechanism according to claim 1.

7. A lid opening/closing mechanism for switching a lid between a closed position closing an opening portion of a base body, and an open position opening the opening portion, comprising:
   an arm allowing a tip side thereof to turn to a front of the base body as a support point with a base end side thereof pivotally supported at the base body by a first axis support portion, and connected to the lid turnably by a second axis support portion, and
   a control member provided to be slidably placed in a guide portion provided in the base body, and turnably connected at a tip side to the lid through a third axis support portion,
   wherein the lid is turned in an opening direction or a closing direction in association with a turn of the arm, and
   the control member reduces an amount of protrusion of the lid toward the front of the base body when the lid is in the closed position or the open position, and provides a maximum amount of protrusion of the lid toward the front of the base body when the lid is turned in the opening direction from the closed position or in the closing direction from the open position, in which the first axis support portion, the second axis support portion, and the third axis support portion are relatively lined up approximately in a straight line viewed parallel to hinging axes of the first, second and third axis support portions.

8. A lid opening/closing mechanism for switching a lid between a closed position closing an opening portion of a base body, and an open position opening the opening portion, comprising:
   an arm allowing a tip side thereof to turn to a front of the base body as a support point with a base end side thereof pivotally supported at the base body by a first axis support portion, and connected to the lid turnably by a second axis support portion,
   a control member provided to be slidably placed in a guide portion provided in the base body, and turnably connected at a tip side to the lid through a third axis support portion, and
   an urging device accumulating an urging force in a process in which the control member increases an amount of protrusion of the lid to the front of the base body, and allowing the control member to move by the urging force thereof in a process in which the control member reduces the amount of protrusion of the lid toward the front of the base body,
   wherein the lid is turned in an opening direction or a closing direction in association with a turn of the arm.

* * * * *